United States Patent  [15] 3,658,591
Fukuda et al.  [45] Apr. 25, 1972

[54] SEALED TYPE CELL

[72] Inventors: Masataro Fukuda, Takatsuki; Takashi Iijma, Hirakata, both of Japan

[73] Assignee: Matsushita Electric Industrial Co., Ltd., Osaka, Japan

[22] Filed: Dec. 7, 1970

[21] Appl. No.: 95,869

Related U.S. Application Data

[63] Continuation of Ser. No. 762,778, Sept. 26, 1969, abandoned.

[30] Foreign Application Priority Data

Oct. 2, 1967 Japan...................................42/64391
Nov. 17, 1967 Japan...................................42/74862

[52] U.S. Cl......................................136/3, 136/6, 136/179
[51] Int. Cl.......................................................H01m 35/00
[58] Field of Search.....................136/179, 3, 6, 24, 28–29, 136/181

[56] References Cited

UNITED STATES PATENTS

| | | | |
|---|---|---|---|
| 2,104,973 | 1/1938 | Dassler | 136/3 X |
| 2,317,711 | 4/1943 | Andre | 136/31.6 |
| 2,934,580 | 4/1960 | Neumann | 136/6 |
| 2,941,022 | 8/1960 | Mandel | 136/6 |
| 2,951,106 | 8/1960 | Ruetschi | 136/6 |
| 3,057,942 | 10/1962 | Smith et al. | 136/28 X |
| 3,117,033 | 1/1964 | Bachmann | 136/179 X |
| 3,170,819 | 2/1965 | Abramson | 136/24 X |

*Primary Examiner*—Anthony Skapars
*Attorney*—Stevens, Davis, Miller & Mosher

[57] ABSTRACT

A sealed type cell which has disposed in the case thereof an electrochemical element so designed as to enable ionization of oxygen and generation of oxygen caused by overcharging to take place cyclically and whose internal resistance depends upon the pressure of oxygen, said electro-chemical element including an oxygen ionizing electrode whose terminal is connected to the negative electrode of the cell and an oxygen generating electrode whose terminal is connected to the positive electrode of the cell, and which can be charged with a large current in a short period of time and is free from degradation of the large current discharge characteristics.

10 Claims, 6 Drawing Figures

Patented April 25, 1972

INVENTORS
MASATARO FUKUDA,
TAKASHI IIJIMA

BY

ATTORNEYS

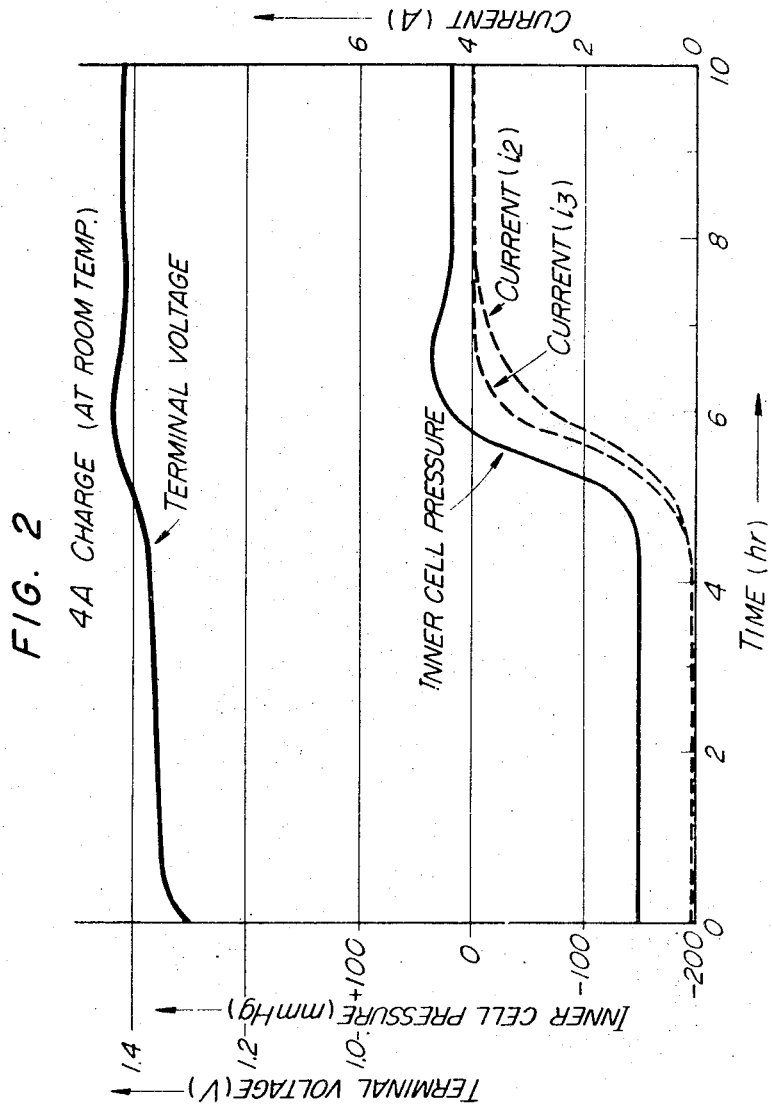

SEALED TYPE CELL

This application is a continuation of our copending application Ser. No. 762,778, filed Sept. 26, 1968, now abandoned.

The present invention relates to a storage battery and more particularly to a novel sealed type cell. Namely, the present invention has for its object the provision of a novel sealed type cell having an electrochemical element disposed therein, which enables an oxygen ionizing reaction and an oxygen generating reaction, caused by overcharging, to take place cyclically and the internal resistance of which depends on the pressure of oxygen in the cell, said electro-chemical element being composed of an oxygen ionizing electrode and an oxygen generating electrode which are connected to the negative electrode and the positive electrode of the cell respectively.

In general, charging of a storage battery results in generation of gases by hydrolysis of water and as a result an electrolyte is concentrated and decreases in volume. This requires the user to supplement the electrolyte from time to time. Namely, maintenance of the storage battery is made considerably more cumbersome for the user. Under the circumstances, there has been a strong demand for a maintenance-free sealed type cell and various sealed type cells have also been proposed in the field of alkaline batteries, some of which are being used for practical applications.

The presently used sealed type alkaline batteries are represented by the following types:

(1) A fact battery of the type wherein, in order to make it possible to seal the battery, the gas absorbing efficiency is enhanced by reducing the quantity of an electrolyte in the battery to such an extent that a separator is just impregnated with the electrolyte, by taking advantage of the face that the cadmium negative electrode and oxygen are considerably reactive with each other.

(2) A type wherein a pressure rise in the battery jar is converted into mechanical energy to actuate a switch provided in an exterior charging circuit, so that a charging current may be controlled by said switch, or a type wherein the inner cell pressure is detected by a pressure sensitive element disposed in the battery jar and the current flowing through the exterior charging circuit is controlled by the output voltage or current of said element.

(3) A type wherein a predetermined amount of the current flowing through the battery is passed through a separate small-sized battery connected to said main battery in parallel in opposite polarity relation and a change in the terminal voltage of said small-sized battery is used as a signal for controlling a charging current. Such a small-sized battery is provided in view of the fact that in a closed type cell a rise of terminal voltage upon completion of the charging is generally not apparent and accordingly it is impossible to use such terminal voltage change as a signal for controlling the charging current.

The sealed type cell of type (1), which is most widely used for practical application at present, has the drawbacks that it is restricted to small sizes up to about 5 AH by reason of its structure and that normally it can be charged with its 10 hour rate discharging current (0.1 C.) at the fastest; charging in a shorter period appears to be difficult from the theory of reaction rate between oxygen and the cadmium negative electrode. Further, the inherent drawback of this type is that, since the quantity of electrolyte is reduced to a minimum, the internal resistance of the battery is large and the discharge efficiency, which is of prime importance for a battery, is considerably sacrificed. Practically, the discharge capacity of the battery, during discharge of a large current more than 1 hour rate discharging current (1 C.), is about 70 percent of that of an open type cell having a sufficient quantity of electrolyte; in addition, the terminal voltage during discharge is low and the flat characteristic is also poor. Furthermore, because of the small quantity of electrolyte, the charging-discharging cycle life of the battery is only as small as about 500 cycles, in contrast to the several thousands cycles of the open type batteries, due to maldistribution or drying up of the electrolyte.

The sealed type cell of type (2), wherein use is made of the inner cell pressure to control a charging current, has the disadvantage that the accessories, such as the pressure sensitive means to be disposed in the cell and a special control circuit to be provided in the exterior charging circuit, are complicated and expensive as compared with the cell proper, and few cells of this type have been put to practical use.

With reference to the sealed type cell of type (3), the control circuit is complicated and expensive, like that of type (2), and in addition, since a voltage change of the separate small-sized battery is used as a signal for controlling the charging current for the main battery, a malfunction or deterioration of said small sized battery becomes a direct cause of malfunction of the main battery, rendering the reliability of the main battery low. This type has not been widely used as yet either.

It is therefore an object of the present invention to provide a novel closed type cell which is free from the foregoing drawbacks of the conventional ones and which can be provided in both small size and large size.

It is another object of the present invention to provide a closed type cell which does not call for a special control circuit exteriorly of the cell and which can be charged with the large current in a short period of time.

It is still another object of the present invention to provide a closed type cell which enables a large current to be used for the discharging thereof.

The present invention will be described in detail hereunder with reference to the accompanying drawings which illustrate the present invention by way of an alkaline battery and in which:

FIG. 2 is a diagram graphically showing changes of the cell voltage, inner cell pressure, oxygen generating current and oxygen ionizing current during charging of the cell;

Figure 1:
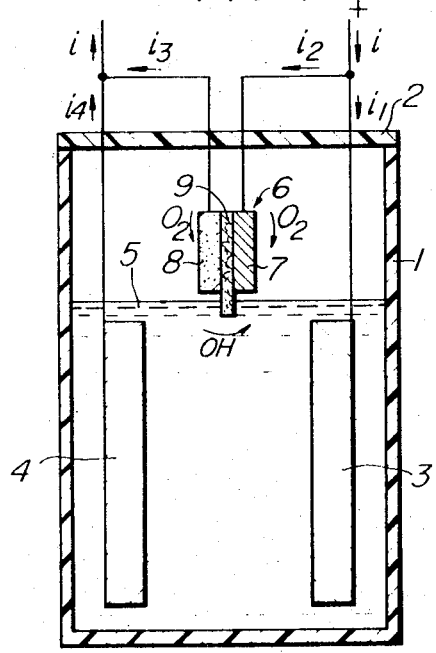
FIG. 1 is a vertical cross-sectional view diagrammatically showing the closed type cell of this invention.

Referring first to FIG. 1, a completely sealed container is composed of a jar 1 and a lid 2, which are made from a durable, thick synthetic resin plate or steel plate with an internal cell pressure of up to 1 atmosphere. In an actual product, a safety valve, so designed as to be opened under a pressure higher than a predetermined value, may be provided to ensure safety of the cell. Reference numeral 3 designates a positive electrode of nickel oxide which may be either the so-called sintered-type electrode or pocket-type electrode of the open type cell, and 4 designates a negative electrode of cadmium which may similarly be either the sintered-type, pocket-type or paste-type electrode. An electrolyte 5 consists mainly of aqueous solution of KOH and a suitable amount of LiOH, etc. may be added thereto as required. Reference numeral 6 generally designates an electrochemical element composed of an oxygen generating electrode 7, an oxygen ionizing electrode 8 and a separator 9. The oxygen generating electrode 7 of the electro-chemical element 6 is made from a thin plate, porous plate or screen of nickel or stainless steel, etc., while the oxygen ionizing electrode 8 is made from a porous plaque consisting primarily of nickel or carbon which is subjected to a water-proofing treatment with the addition of such an oxygen ionizing catalyst as silver. The separator 9 through which $OH^-$ moves, consists of an electrolyte-resistant non-woven fabric of synthetic resin or Japanese paper, which is impregnated with the electrolyte, and has its lower end dipped in the electrolyte 5.

Before describing the method of assembling and sealing the closed type cell of this invention, the principle upon which the present cell operates will be explained hereunder. The electrochemical element which is the most critical part in the present sealed type cell has such characteristic feature that when no oxygen is present in the cell, it remains completely inactive with a large electric resistance, permitting no current to flow therethrough, whereas on the contrary when oxygen comes to be present in the cell by overcharging, it is activated and becomes electrically conductive as the pressure of oxygen increases, enabling an oxygen generating reaction and an oxygen ionizing reaction to take place completely cyclically as represented by the following chemical formulae and thereby not permitting a gas pressure build-up in the cell.

At the oxygen gas generating electrode $4OH^- \rightarrow O_2\uparrow + 2H_2O + 4e^-$ At the oxygen ionizing electrode $\downarrow O_2 + 2H_2O + 4e^- \rightarrow 4OH^-$ By incorporating the electrochemical element in the manner shown in FIG. 1, no oxygen is generated during charging of the active substances, that is, during the reaction represented by the formula $$2Ni(OH)_2 + Cd(OH)_2 \rightarrow 2NiOOH + Cd + H_2O$$

so that $i$ (charging current) $= i_1$ (positive electrode active substance charging current) and $i_2$ (oxygen generating current) $= O$. Namely, the entire current is effectively used for the charging of the active materials. Upon completion of the charging of the active substances, oxygen begins to be generated at the nickel oxide positive electrode, so that $i_3$ (oxygen ionizing current) increases slowly and successively thereafter $i_2$ also increases. When a state of complete overcharge is produced, $i = i_2 = i_3$ and an equilibrium pressure is obtained, whereby it becomes possible to close the cell ($i_4$ represents a negative electrode active substance charging current). Therefore, in order to enable the cell to be closed satisfactorily, the electrochemical element is required to fulfill the following conditions:

1. Oxygen ionizing electrode
   a. The oxygen ionizing reaction rate is high and the active life is long. This is necessary to make it possible to charge the cell with a large current in a short period of time and to enable the reactions to take place completely cyclically for preventing the inner cell pressure from rising and stabilizing the inner cell pressure at a constant value over a prolonged period.
   b. It causes no side reactions, such as dissolution and precipitation, when oxygen is not present. This is necessary for the prevention of self-discharge and improvement of the discharge efficiency.
   c. The hydrogen generating potential is less noble than or at least equal to that of the negative electrode. This is one of the characteristic features of the present invention and since the oxygen ionizing electrode is connected to the negative electrode, hydrogen will be generated at the oxygen ionizing electrode before the active material is fully charged and therefore it will be impossible to close the cell, if the hydrogen generating potential is more noble than that of the negative electrode.

2. Oxygen generating electrode
   a. The oxygen generating potential is higher than or at least equal to that of the positive electrode. This is necessary because, since the oxygen generating electrode is connected directly to the positive electrode, if the oxygen generating potential is lower than the potential of the positive electrode, the positive electrode active substance will not be fully charged, resulting in degradation of the discharge capacity.
   b No dissolution or precipitation take place when no oxygen is present. This is necessary for the same reason as mentioned under the oxygen ionizing electrode.

3. Separator
   a. It must be resistant against the electrolyte and against oxidation and reduction. This is necessary for prolonging the service life of the separator.
   b. It has excellent $OH^-$ ion conducting property. This is necessary in order that the diffusion of $OH^-$ does not become a rate determining step.

The ionizing electrode of an electrochemical element which satisfies the conditions set forth above, is produced by sintering, for example, nickel powder, carbon powder or a mixture thereof to form a porous plaque and subjecting said porous base plate to a water-proofing treatment with polytetrafluorethylene or paraffin either as such or with the addition thereto of silver as a catalyst. In this way, the diffusion of oxygen and the oxygen ionizing speed can be accelerated by the addition of silver to the porous plate, while shortening of the active life, resulting from wetting of the electrode surface, can be prevented by the water-proofing treatment, and thus the condition of (a) can be fulfilled. The oxygen ionizing electrode produced in the manner described is also advantageous to satisfy condition (b) because nickel, carbon and silver are all stable in an alkaline solution and particularly the electrode is maintained at a cathodic potential as it is connected to the negative electrode. Further, the oxygen ionizing electrode meets condition (c) because the hydrogen generating potentials of nickel, carbon and silver are $-1,100^{mV}$ (vs.HgO), $-1,150^{mV}$ (vs.HgO) and $-1,350^{mV}$ (vs.HgO) as against the charging potential of $-900^{mV}$ (vs.HgO) and the hydrogen generating potential of $-1,100^{mV}$ (vs.HgO) of the cadmium negative electrode. Besides the materials mentioned above, stainless steel also satisfies the above-described conditions (a) to (c) when used for the production of the oxygen ionizing electrode. On the other hand, the oxygen generating electrode is made from a plate or screen of nickel, monel metal or carbon. The oxygen generating electrode thus produced is satisfactory with respect to condition (a) because the oxygen generating potentials of nickel, monel metal and carbon are about $+520^{mV}$ (vs.HgO), $+520^{mV}$ (vs.HgO) and $+550^{mV}$ (vs.HgO) respectively as against the charging potential of $+450^{mV}$ (vs.HgO) and the oxygen generating potential of $+550^{mV}$ (vs.HgO) of the positive electrode. With regard to condition (b), nickel, monel metal and carbon are stable in an alkaline solution without dissolving therein. Besides these material, stainless steel also satisfies aforesaid conditions (a) to (c) and can be used as a material for the oxygen generating electrode.

The separator which is required to be resistant against alkaline and oxidation and capable of conducting $OH^-$, is made from a synthetic resin non-woven fabric, cotton or Japanese paper. A non-woven fabric of nylon has proved to be best. In some cases, a semi-pervious film, such as polyvinyl alcohol or cellophane film, may be interposed to prevent precipitation and passage of a small amount of nickel oxide, etc.

By disposing the above-described electrochemical element in the cell, it is possible to completely seal the cell with a large amount of electrolyte therein. As described previously, the conventional sealed type cell wherein the quantity of an electrolyte in the cell is minimized to provide the cadmium negative electrode with a gas absorbing ability, had the drawback that the utility of the cell is about 75 percent of that of a cell having a sufficient amount of electrolyte therein. Such drawback of the conventional sealed type cell can be completely eliminated by the present sealed type cell as described above. Further, the discharging performance of the present sealed type cell at such a high rate discharging as 1 hour rate or higher is remarkably improved, since it has a sufficient amount of electrolyte and its internal resistance is small. The gas absorbing ability of a cell containing a small amount of electrolyte therein, may be effectively improved by further reducing the electrolyte in contact with the cadmium negative electrode or to apply a water-proofing treatment to the electrode, but such actions will obviously result in degradation of the discharge efficiency of the cell. According to the present invention, however, it is possible to enhance the performance of the electrochemical element, particularly the oxygen ionizing electrode, in contact with a gas phase, without degrading the discharge efficiency. For this purpose, according to the present invention a catalyst is used which promotes ionization of oxygen and a water-proofing treatment is conducted on the oxygen ionizing electrode to extend the service life thereof.

Further, the oxygen ionizing electrode and the oxygen generating electrode are arranged face to face with a thin separator intervening therebetween to shorten the diffusion distance of OH⁻ and thereby facilitate the dispersion of OH⁻ which becomes a rate determining step in the oxygen ionizing reaction. Still further, a device is made so that the reaction may take place uniformly over the entire area of the oxygen ionizing electrode. It is also to be noted that the present sealed type cell may be provided in such a shape that it can be conveniently used along with a conventional one of the liquid plug type. As described hereinabove, it is possible according to the present invention to provide a reliable, safe sealed type cell, without degrading the discharge efficiency.

The present invention will be further illustrated by way of example hereinafter.

EXAMPLE 1

As a sealed type cell, a 20 Ah sintered-type nickel-cadmium alkaline battery is used. A method of producing an electrochemical element which enables the cell to be charged with a current of 4A (5 hour rate) and the charging and discharging characteristics of the sealed type cell having the electrochemical element disposed therein, will be explained.

Production of the oxygen ionizing electrode of the electrochemical element:

A mixture of carbonyl nickel powder and carbon powder in a proportion of 9 to 1 (by weight) is attached to both sides of a nickel net in the size of 30 × 40 × 0.7 mm. and sintered at 900° C. for 10 minutes in a hydrogen stream, to obtain a porous plaque, to which silver is added in the proportion of about 5 mg. per cm². in the following manner. A solution of 20 g. of $AgNO_3$ in 100 ml. of $H_2O$ is impregnated in the plaque and after drying, the plaque is immersed in a mixture of formalin and 1.30$^{s.g.}$ KOH in the proportion of 1 to 1 (by volume) for reduction, and thereafter washed with water and dried. In order to improve the performance and prolong the service life of the thus treated plate as a gas ionizing electrode, the plate is immersed in a dispersion of polytetrafluoroethylene and after drying, subjected to a heat treatment at 350° C. in a nitrogen atmosphere.

Oxygen generating electrode: A thin nickel plate of 30 × 40 × 0.05 mm. in size is used.

Separator: A 40 × 40 mm. non-woven fabric of nylon (0.2 mm. in thickness) is used.

Two oxygen ionizing electrodes 8, one oxygen generating electrode 7 and two separators 9, obtained in the manner described above, are assembled as shown in FIG. 6 to compose the electrochemical element. This electro-chemical element is disposed in the 20AH cell. In this case, the quantity of an electrolyte is adjusted such that the lower ends of the separators are dipped in the electrolyte. The cell is charged fully and after removing gases from the cell, air is introduced into the cell to form an air atmosphere therein. Use of oxygen is more advantageous over air for improving the gas absorbing ability but since it is conceivable that the interior of the cell is reduced to a pressure of −760 mm.Hg. and further an actual product will encounter a problem of gas leakage, the air atmosphere was used in this Example.

After the cell is closed tightly with the air atmosphere therein, the oxygen ionizing electrode of the electrochemical element is connected with the cadmium negative electrode and the oxygen generating electrode with the nickel oxide positive electrode, and the cell is left to stand still. In the meantime, oxygen in the air forms OH⁻ ion at the oxygen ionizing electrode and the OH⁻ ion reacts with the negative electrode giving $Cd(OH)_2$.

In this case, the inner cell pressure is reduced by about 15 mm.Hg. which is the partial pressure of oxygen in air. The fact that Cd is converted into $Cd(OH)_2$ means discharge of the negative electrode. Therefore, when the cell is charged, oxygen gas is generated first from the positive electrode and the electrochemical element functions properly. Thus, the cell can be sealed.

Figure 3:
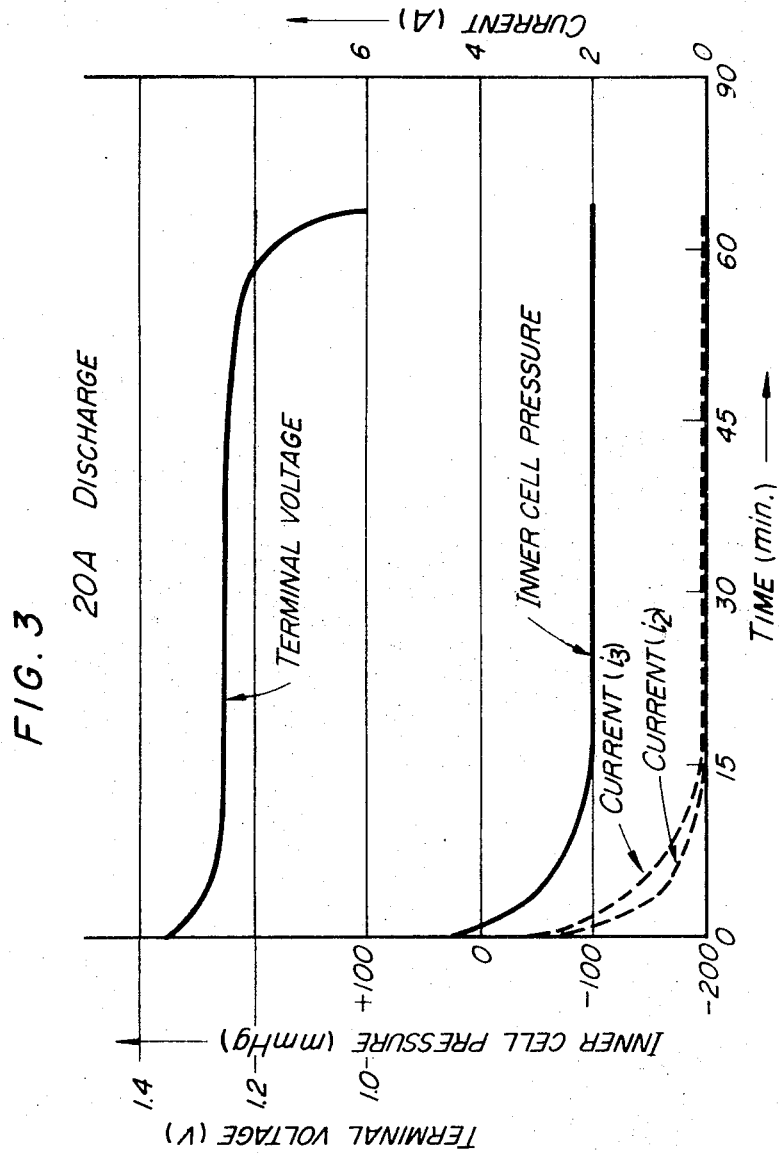
FIG. 3 is a diagram graphically showing changes of the cell voltage, inner cell pressure, oxygen generating current and oxygen ionizing current during discharge of the battery.

In order to observe the function of the cell, the inner cell pressure was measured by a pressure gauge provided on the cell, along with the values of $i_2$ (oxygen generating current) and $i_3$ (oxygen ionizing current), with the results shown in FIGS. 2 and 3.

FIG. 2 shows the function of the cell when charged with a current of 4A (5 hour rate). As seen, the inner cell pressure does not change, and $i_2$ and $i_3$ remain 0 for 5 hours until the end of charging. This indicates that the charging current is entirely used for the charging of the active materials. As the cell becomes overcharged upon passage of 5 hours, the inner cell pressure begins to rise and at the same time the value of $i_2$ increases. The value of $i_3$ increases successively. The value of $i_2$ is slightly smaller than the value of $i_3$, because the difference $i_1$ therebetween is used for the charging of an uncharged portion or for the compensation of self-discharge current. When the value of $i_3$ becomes equal to the value of $i$ (4A), the inner cell pressure reaches an equilibrium state and in the meantime a state of $i = i_3 = i_2 = $ (4A) is produced. This state continues thereafter. This indicates that reactions represented by the formula

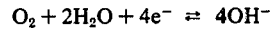

are taking place completely cyclically at the electrochemical element. Although in this Example, use was made of an electrochemical element adapted for 5 hour rate charging, a shorter hour rate charging is also possible and the size can be made smaller by the use of an electrochemical element of higher performance. The electrochemical element behaves in substantially the same manner in the constant-voltage charging.

The discharge characteristic of the charged cell is shown in FIG. 3. As will be seen from the chart, the inner cell pressure, on commencement of discharge, quickly drops to −150 mm.Hg., that is, the state of air wherein the oxygen partial pressure is O, as a result of a reaction represented by the formula

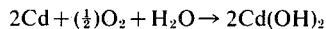

and the values of $i_3$ and $i_2$ also become O. Namely, the cell shows a sufficiently satisfactory discharge characteristic. The fact that the values of $i_3$ and $i_2$ become O indicates that the cell is free of self-discharge.

The Example illustrated above is the most standard one. A deterioration of the oxygen ionizing electrode of the electrochemical element is mainly caused by the fact that the water repellency of that surface of the electrode which is in contact with the gases is lost and the passage (diffusion) of the gas through the electrode is blocked by the electrolyte attached to said surface.

Figure 4:
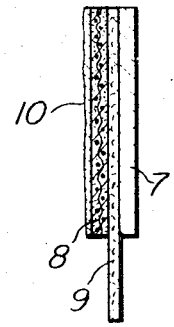
FIGS. 4 and 5 are vertical cross-sectional views of different forms of an electrochemical element.

For preventing such deterioration of the oxygen ionizing electrode and thereby prolonging the life of the same, it is preferable to provide a water-repellent layer 10 on that surface of the electrode which is brought into contact with gases as shown in FIG. 4. This may be attained by either attaching to the surface of the porous oxygen ionizing electrode a water-repellent synthetic resin powder, particularly a powder of fluorine-contained resin, e.g. tetrafluoroethylene-hexafluoroporpylene copolymer, or attaching to the surface of said porous oxygen ionizing electrode with pressure a gas-pervious non-woven fabric made of a fiber of water-repellent synthetic resin, particularly fluorine-contained resin, e.g. polytetrafluoroethylene or the paper being sold by Daikin Kogyo K.K. under the trade name of "Polyflon Paper." By providing such a water-repellent layer on the surface of the oxygen ionizing electrode, the surface is prevented from being wetted and remains active, whereby a long service life of the electrode is assured.

Alternatively, the oxygen ionizing electrode may consist of active carbon shaped into a porous plate where the cost is desired to be reduced, although such electrode is somewhat inferior in oxygen ionizing activity to the aforesaid electrode consisting of the nickel plaque with silver added thereto. The porous plate of active carbon can be used as an oxygen ionizing electrode only by subjecting it to a water-proofing treatment because of the excellent catalytic activity of active carbon. Further, since the hydrogen overvoltage is less noble than that for the negative electrode, the oxygen ionizing electrode of active carbon is sufficiently serviceable for practical use from the standpoint of performance and being inexpensive.

For the actual product of the closed type cell according to this invention, it is one of the essential requirements that the electrochemical element only can be exchanged in a simple manner so as to use the cell over an extended period or upon occurrence of unexpected trouble. Such requirement may be met by connecting the electrochemical element integrally to a conventional vent plug as shown in FIG. 6.

Figure 6:
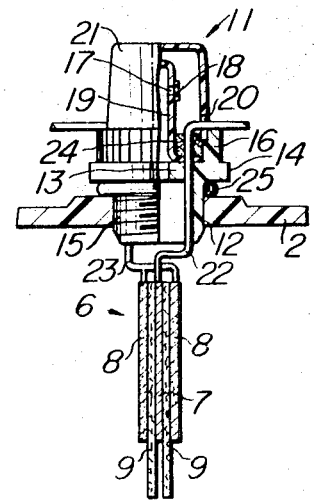
FIG. 6 is a view of the electrochemical element connected to a vent plug.

Namely, referring to FIG. 6, a vent plug 11 to be fitted in a filling hole 12 formed in the lid 2 comprises a cylindrical plug body 16 having an inner flange 13, an outer flange 14 and an externally threaded portion 15 for engagement with an internal thread of the filling hole; a cylindrical inner cap 19 closed at the top end and resting on said inner flange 13, said inner cap having formed therein vent holes 17 which are closed with an annular rubber valve member 18; and an outer cap 21 having a pair of vent holes 20 formed therein. A lead 22 of the oxygen generating electrode 7 and a lead 23 of the oxygen ionizing electrodes 8 of the electrochemical element 6 pass through the inner flange 13 and the inner cap 19 and are led to the outside through the vent holes 20 respectively. Reference numeral 24 designates an adhesive consisting of an epoxy resin, which is used to seal the portions where leads 22 and 23 penetrate through the inner flange 13 and also to fixedly secure the inner cap 19 and the outer cap 21 with each other, and reference numeral 25 designates a packing. By connecting the electrochemical element 6 to the vent plug 11 integrally in the manner described, mounting or demounting or exchange of the electrochemical element 6 can be effected conveniently.

Figure 5:

When the electrochemical element is to be connected to the vent plug 11 as described above, the size of the element undergoes a limitation. Therefore, it is preferable to shape the electrochemical element in a cylindrical configuration as shown in FIG. 5 so as to increase the reaction area. With the vent plug 11 shown in FIG. 6, the gases interior of the cell, when the inner cell pressure has risen abnormally, move out of the inner cap 19 through the vent holes 17 upon forcibly expanding the rubber valve 18 and then are exhausted to the outside through the vent holes 20. However, such structure of the vent plug is of no importance to the closed type cell of the present invention.

Although the present invention has been described and illustrated with particular reference to an alkaline battery, the invention is similarly applicable to batteries using an acidic electrolyte by properly selecting the materials of the oxygen ionizing electrode and the oxygen generating electrode.

As will be understood from the foregoing description, it is possible according to the present invention to close batteries of various sizes ranging from small-sized portable batteries to large-sized stationary batteries, which are basically of the same structure as conventional open type cells in respect of quantity of electrolyte and separator. Accordingly, the sealed type cell incorporating the present invention is entirely free from the degradation of large current discharge characteristics which has been encountered heretofore as a result of closing the conventional cells, and the charging-discharging life thereof is either equal to or even longer than that of the open type cells. In addition, the sealed type cell according to the invention can be charged with a large current in a short period of time because the oxygen absorbing velocity is several tens times as high as that obtainable with a conventional negative electrode, e.g. cadmium electrode, owing to the oxygen ionizing electrode; further the cell is highly reliable in function since the electrochemical element closed in the cell functions solely with the oxygen interior of the cell.

Another advantage of the present sealed type cell is that it can be produced simply and at low cost because it does not require a special control circuit in the exterior charging circuit.

Thus, according to the present invention, a notably excellent sealed type cell can be provided industrially simply at low cost.

What is claimed is:

1. A sealed type cell having disposed in the case thereof a positive electrode, a negative electrode, an electrolyte and means cyclically ionizing and generating oxygen caused by overcharging of said cell, said means including an electrochemical element independent of said positive and negative electrodes and having an internal resistance dependent upon the partial pressure of oxygen in said cell, said electrochemical element including an oxygen ionizing electrode whose terminal is connected to said negative electrode of said cell, an oxygen generating electrode whose terminal is connected to said positive electrode of said cell, and an ion-conductive separator interposed between said oxygen ionizing electrode and said oxygen generating electrode, said ion-conductive separator being partly immersed in said electrolyte.

2. A sealed type cell as defined in claim 1, wherein said oxygen ionizing electrode has a hydrogen overvoltage less noble than or at least equal to that of the negative electrode of the cell, and said oxygen generating electrode has an oxygen overvoltage more noble than or at least equal to that of the positive electrode of the cell.

3. A sealed type cell as defined in claim 2, wherein said electrochemical element is connected to a vent plug.

4. A sealed type cell as defined in claim 3, wherein said electrochemical element comprising the oxygen ionizing electrode, the oxygen generating electrode and the ion-conductive separator interposed between said oxygen ionizing electrode and said oxygen generating electrode is cylindrical in shape.

5. A sealed type cell as defined in claim 2, wherein said oxygen generating electrode is subjected to a water-proofing treatment.

6. A sealed type cell as defined in claim 2, wherein said oxygen ionizing electrode has a water repellent layer formed at that portion thereof which is brought into contact with a gas phase, said water repellent layer consisting of a fluorine-contained resin.

7. A sealed type cell as defined in claim 2, wherein said oxygen ionizing electrode is made of an electrode material selected from the group consisting of nickel, carbon, monel metal and stainless steel.

8. A sealed type cell as defined in claim 2, wherein said oxygen generating electrode is made of an electrode material selected from the group consisting of nickel, carbon, monel metal and stainless steel.

9. A sealed type cell as defined in claim 7, wherein said oxygen ionizing electrode carries thereon at least one catalyst selected from the group consisting of silver, palladium, platinum and gold.

10. A sealed type cell having disposed in the case thereof a positive electrode, a negative electrode, an electrolyte and an electrochemical element independent of said positive and negative electrodes, said electrochemical element including an oxygen ionizing electrode whose terminal is connected to said negative electrode of said cell, an oxygen generating electrode whose terminal is connected to said positive electrode of said cell, and an ion-conductive separator interposed between said oxygen ionizing electrode and said oxygen generating electrode, said ion-conductive separator being partly immersed in said electrolyte.

* * * * *

PO-1050
(5/69)

UNITED STATES PATENT OFFICE
CERTIFICATE OF CORRECTION

Patent No. 3,658,591                    Dated  April 25, 1972

Inventor(s)  MASATARO FUKUDA et al

It is certified that error appears in the above-identified patent and that said Letters Patent are hereby corrected as shown below:

On the title page, line [72], correct the spelling of the name of the second inventor to read:

Takashi Iijima

On the title page, line [63], correct the date to read

Sept. 26, 1968

Signed and sealed this 31st day of October 1972.

(SEAL)
Attest:

EDWARD M.FLETCHER,JR.                   ROBERT GOTTSCHALK
Attesting Officer                       Commissioner of Patents